US012697773B2

(12) United States Patent
Leard et al.

(10) Patent No.: US 12,697,773 B2
(45) Date of Patent: Aug. 4, 2026

(54) HIGH SPEED LIGHT VALVE SYSTEM

(71) Applicant: Seurat Technologies, Inc., Wilmington, MA (US)

(72) Inventors: Francis L. Leard, Sudbury, MA (US); James A. DeMuth, Woburn, MA (US); Andrew J. Bayramian, Marblehead, MA (US); Susanne Kras, Chelmsford, MA (US); William H. Clauson, Nashua, NH (US); Craig Garvin, Cambridge, MA (US); Matthew Murachver, Long Beach, CA (US)

(73) Assignee: Seurat Technologies, Inc., Wilmington, MA (US)

( * ) Notice: Subject to any disclaimer, the term of this patent is extended or adjusted under 35 U.S.C. 154(b) by 791 days.

(21) Appl. No.: 17/513,230

(22) Filed: Oct. 28, 2021

(65) Prior Publication Data

US 2023/0134032 A1 May 4, 2023
US 2023/0373161 A9 Nov. 23, 2023

Related U.S. Application Data

(60) Provisional application No. 63/107,310, filed on Oct. 29, 2020.

(51) Int. Cl.
*B29C 64/282* (2017.01)
*B22F 10/28* (2021.01)
(Continued)

(52) U.S. Cl.
CPC ............ *B29C 64/282* (2017.08); *B22F 12/45* (2021.01); *B29C 64/268* (2017.08); *B29C 64/286* (2017.08); *B33Y 30/00* (2014.12);

*B22F 10/28* (2021.01); *B28B 1/001* (2013.01); *B29C 64/153* (2017.08); *B33Y 10/00* (2014.12)

(58) Field of Classification Search
CPC ......... Y02P 10/25; B33Y 10/00; B33Y 30/00; B29C 64/153; B29C 64/268; B29C 64/277; B29C 64/282; B29C 64/129; B29C 64/135; B29C 64/264; B29C 64/273; B29C 64/286; B29C 64/291; B29C 71/04; B28B 1/001;
(Continued)

(56) References Cited

U.S. PATENT DOCUMENTS 5,085,498 A * 2/1992 Yamamoto ............. G11B 7/135
5,196,767 A 3/1993 Leard
(Continued)

FOREIGN PATENT DOCUMENTS

JP 1991020720 1/1991
JP 1991111809 5/1991
(Continued)

OTHER PUBLICATIONS

Translation of WO 2005090056A1, Monsheimer, Sep. 2005.*
Translation JP-H0651340, Yoshida. (Year: 1994).*

*Primary Examiner* — Philip C Tucker
*Assistant Examiner* — Jimmy R Smith, Jr.
(74) *Attorney, Agent, or Firm* — David R. Stevens; Stevens Law Group

(57) ABSTRACT

An additive manufacturing system includes a high power laser to form a high fluence laser beam. A 2D patternable light valve having a structure responsive to electron emission is positioned to receive and pattern light received from the high power laser.

5 Claims, 16 Drawing Sheets

(51) Int. Cl.
B22F 12/45 (2021.01)
B29C 64/153 (2017.01)
B29C 64/268 (2017.01)
B29C 64/286 (2017.01)
B33Y 30/00 (2015.01)
*B28B 1/00* (2006.01)
*B33Y 10/00* (2015.01)

(58) Field of Classification Search
CPC .......... B22F 10/28; B22F 10/70; B22F 12/41;
B22F 12/44; B22F 12/45
See application file for complete search history.

(56) References Cited

U.S. PATENT DOCUMENTS

| | | | | |
|---|---|---|---|---|
| 5,471,341 | A | 11/1995 | Warde et al. | |
| 5,617,203 | A * | 4/1997 | Kobayashi | G01N 21/95623 |
| | | | | 250/550 |

| | | | | |
|---|---|---|---|---|
| 2006/0132066 | A1 * | 6/2006 | Winer | G09G 3/3406 |
| | | | | 315/363 |
| 2017/0144224 | A1 | 5/2017 | Demuth | |
| 2017/0232557 | A1 * | 8/2017 | DeMuth | B33Y 50/02 |
| | | | | 148/525 |
| 2019/0104301 | A1 | 4/2019 | Richards | |
| 2021/0181391 | A1 * | 6/2021 | Subramaniyam | G01N 21/774 |
| 2023/0313043 | A1 * | 10/2023 | Saito | G02F 1/1313 |
| | | | | 349/33 |

FOREIGN PATENT DOCUMENTS

| | | | | |
|---|---|---|---|---|
| JP | 1994051340 | 2/1994 | | |
| JP | 1994067196 | 3/1994 | | |
| JP | 2003156722 | 5/2003 | | |
| WO | WO-2005090056 A1 * | 9/2005 | ......... | B29C 67/0077 |

* cited by examiner

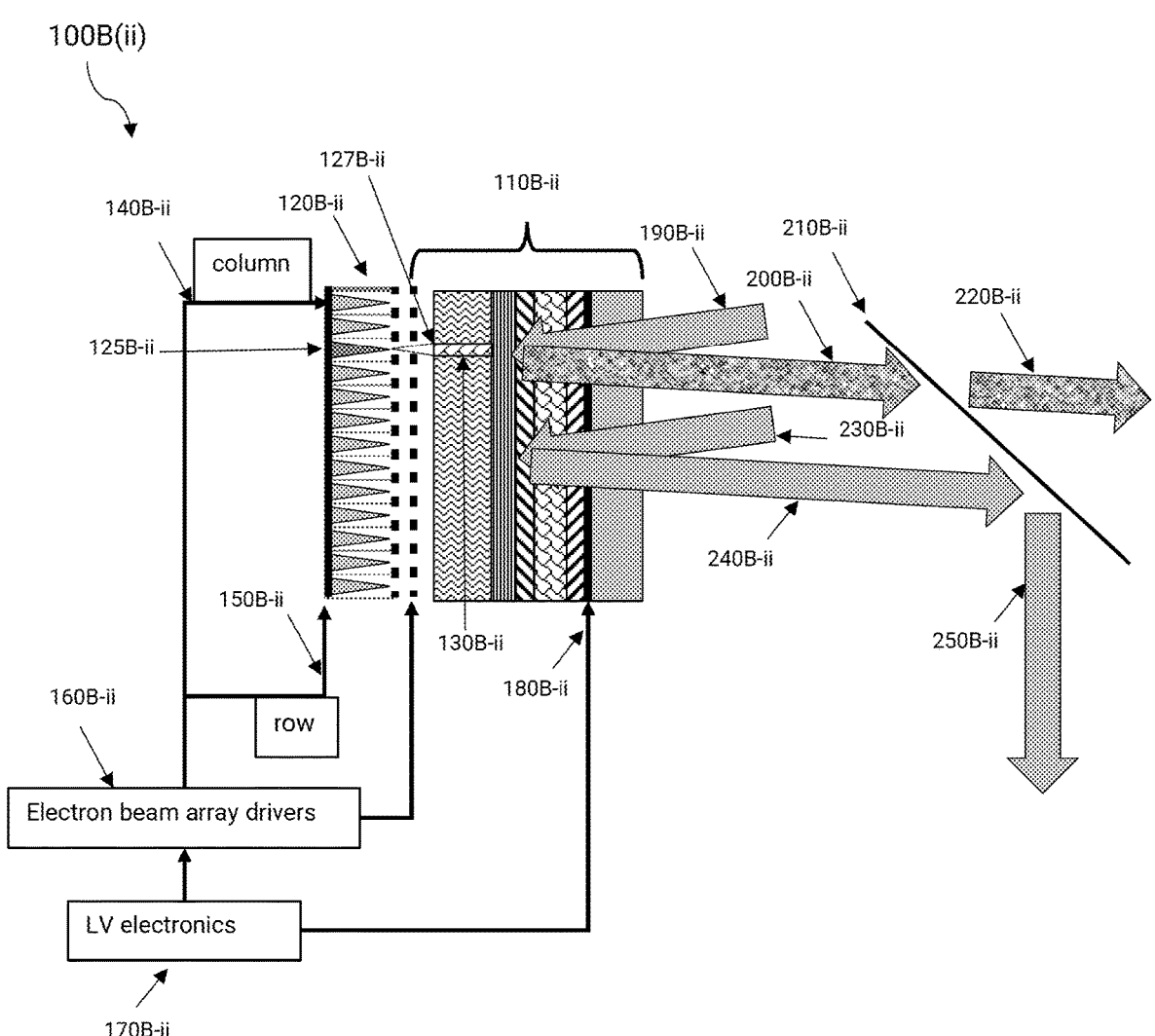
Fig. 1B(ii)

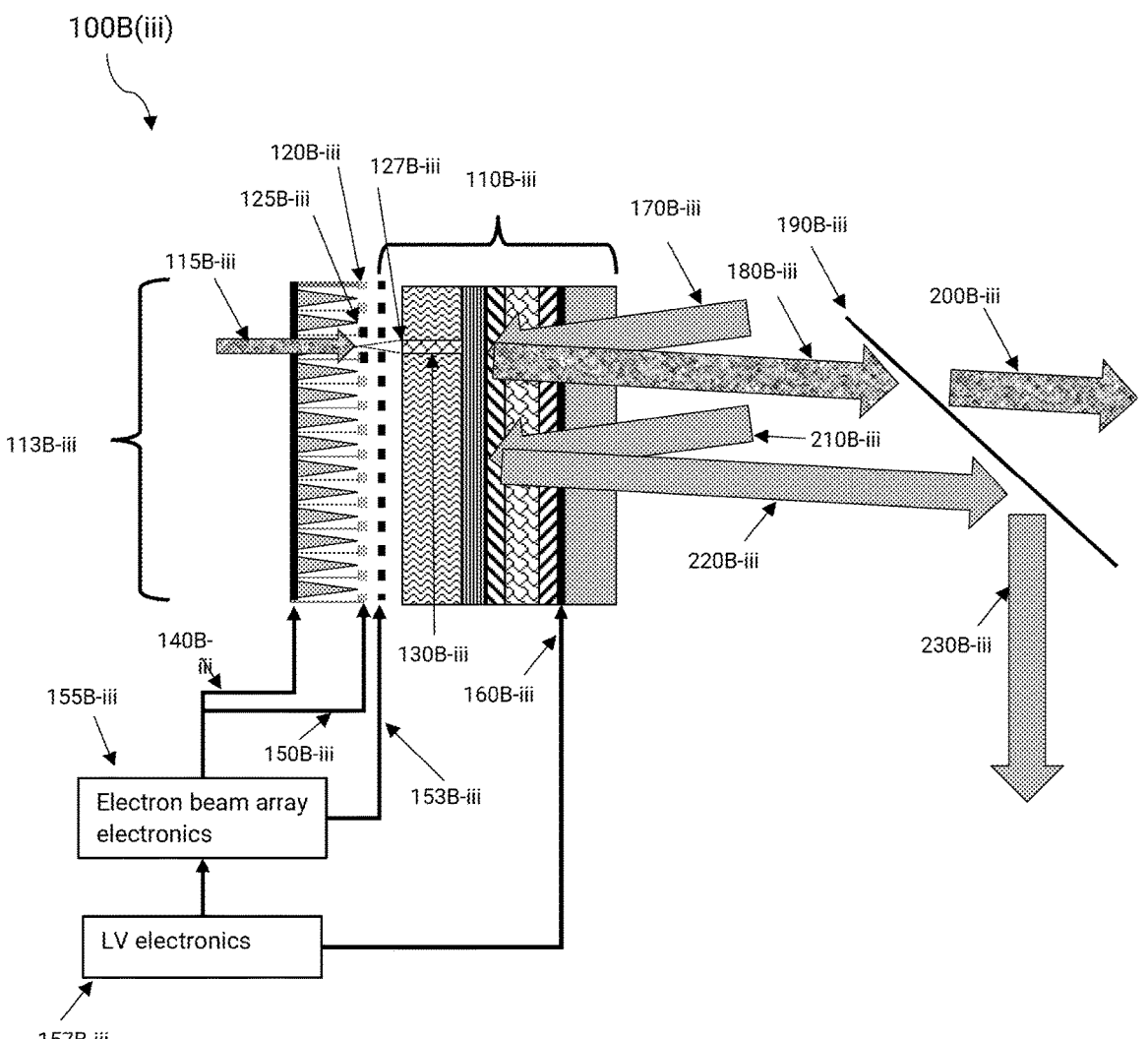
Fig. 1B(iii)

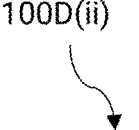
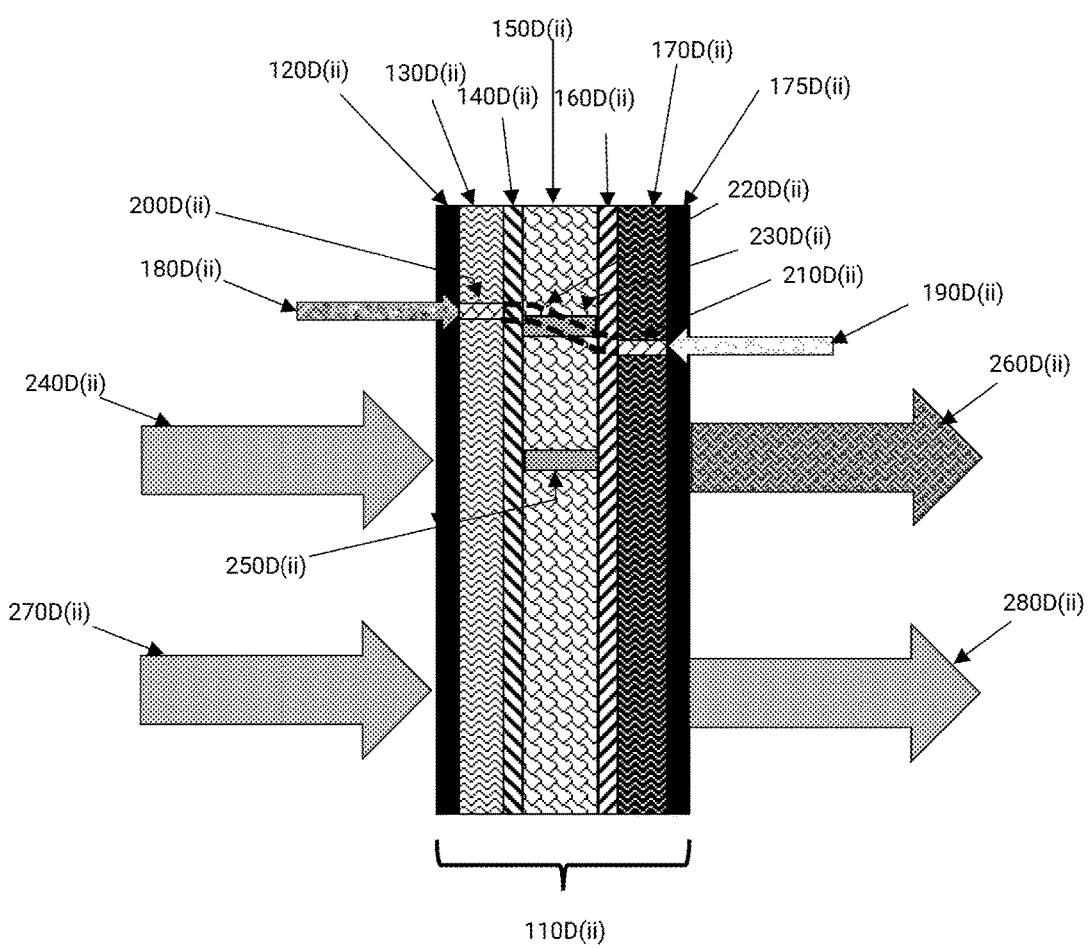
Fig. 1D(ii)

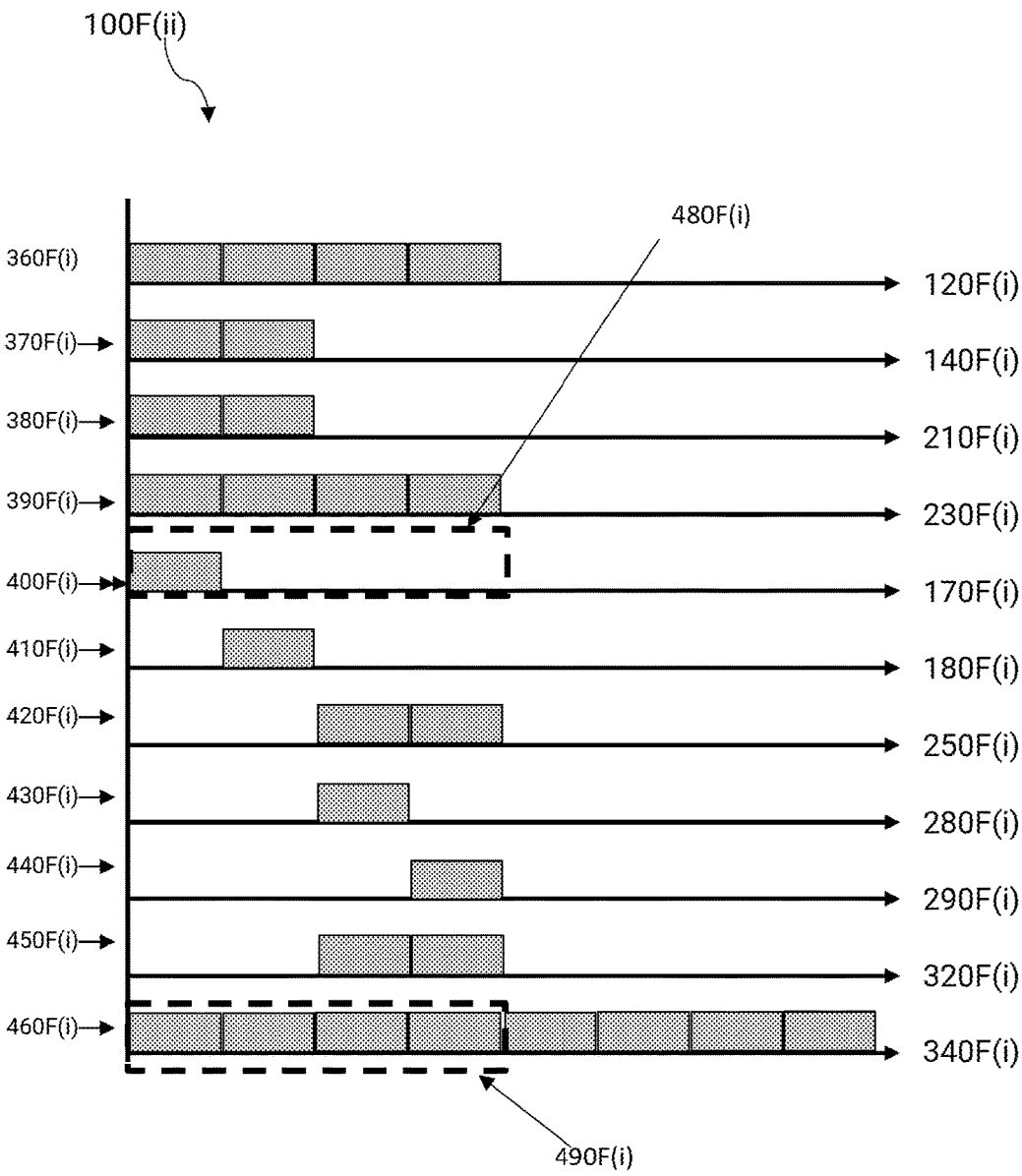
Fig. 1F(ii)

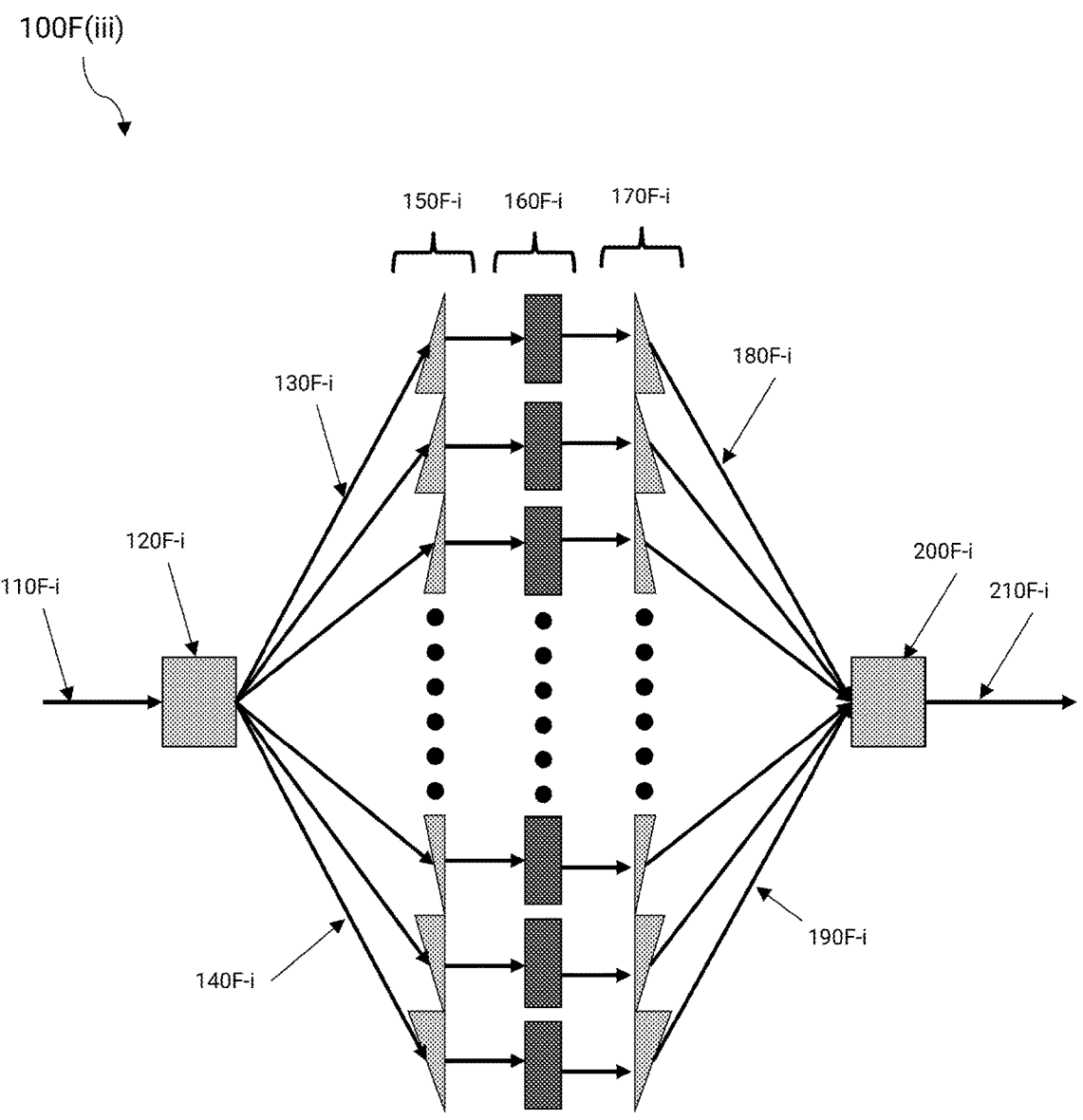
Fig. 1F(iii)

HIGH SPEED LIGHT VALVE SYSTEM

RELATED APPLICATION

The present disclosure is part of a non-provisional patent application claiming the priority benefit of U.S. Patent Application No. 63/107,310, filed on Oct. 29, 2020, which is incorporated by reference in its entirety.

TECHNICAL FIELD

The present disclosure generally relates to operation of high speed light valve systems. More particularly, use of electron emission and novel architecture suitable for high speed operation is described.

BACKGROUND

High power laser systems able to operate at high fluence for long durations are useful for additive manufacturing and other applications that can benefit from use of patterned high energy lasers. Unfortunately, many existing high power laser systems needed for additive manufacturing or other applications cannot operate at full speed due to relatively slower operation of light valves.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1B(ii) illustrates an example of an embodiment to an EBA-RLV incorporating an electron beam array;

FIG. 1B(iii) illustrates an example of an embodiment of an EBA-RLV incorporating a photoconducting separating layer;

FIG. 1D(ii) illustrates an example of a high-speed dual photoconductor LV utilizing fringe field switching;

FIG. 1F(iii) illustrates an example of use of multi-point LVs switches for the high speed LV system of FIG. 1F(i);

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, an additive manufacturing system includes a high power laser to form a high fluence laser beam. A 2D patternable light valve having a structure responsive to electron emission is positioned to receive and pattern light received from the high power laser.

Light valve (LV) technology is limited in ability to switch pixel speeds. In some described embodiments discussed herein:

The use of described LVs in a metal additive manufacturing system (M-AM LV) system allows for a large increase (>1000× over conventional LVs) in speed by changing to materials that can support fast switching times such as LiNbO3, BBO, KDP or K*DP;

The use of described LVs in a M-AM LV system allows reduced complexity of while allowing for >10-1000× improvement (over existing LV M-AM systems) in frame speed;

The use of described LVs in a M-AM system allows for speed improvements due to the ability to use fringe field switching (FFS) in a LV system while reducing complexity. This reduction is due to reduced thickness of the LEOL when using Fringe field switching with an expected speed increase of 4-10× (over existing LV M-AM systems);

The use of described LVs in a M-AM LV allows for In-plane switching to be realized in a LV with its commensurate speed increase due to a thickness reduction of it LEOL layer, such speed increase are similar to that of Fringe Field (4-10×) but at a reduced complexity over that required in FFS;

The use of described LVs in a M-AM LV system allows for the use of PI cells to be used in a binary tree with slow patterning LVs and timewise slicing the output of the 2N LVs into a sequence resulting in an Nx improvement in overall frame speed over conventional M-AM LV systems;

The use of described LVs in a M-AM LV system allows for an improvement in speed by using a solid state scanning (SSS) non-patterning LV to select an array of 1D or 2D slow LVs with speeds dependent on number of set angles that the SSS can attain. Such a system also allows for random access sequencing of the slow patterning LVs.

Figure 1A:
FIG. 1A illustrates an example of a high speed reflective light valve (RLV) for metal additive manufacturing.
Figure 1A:
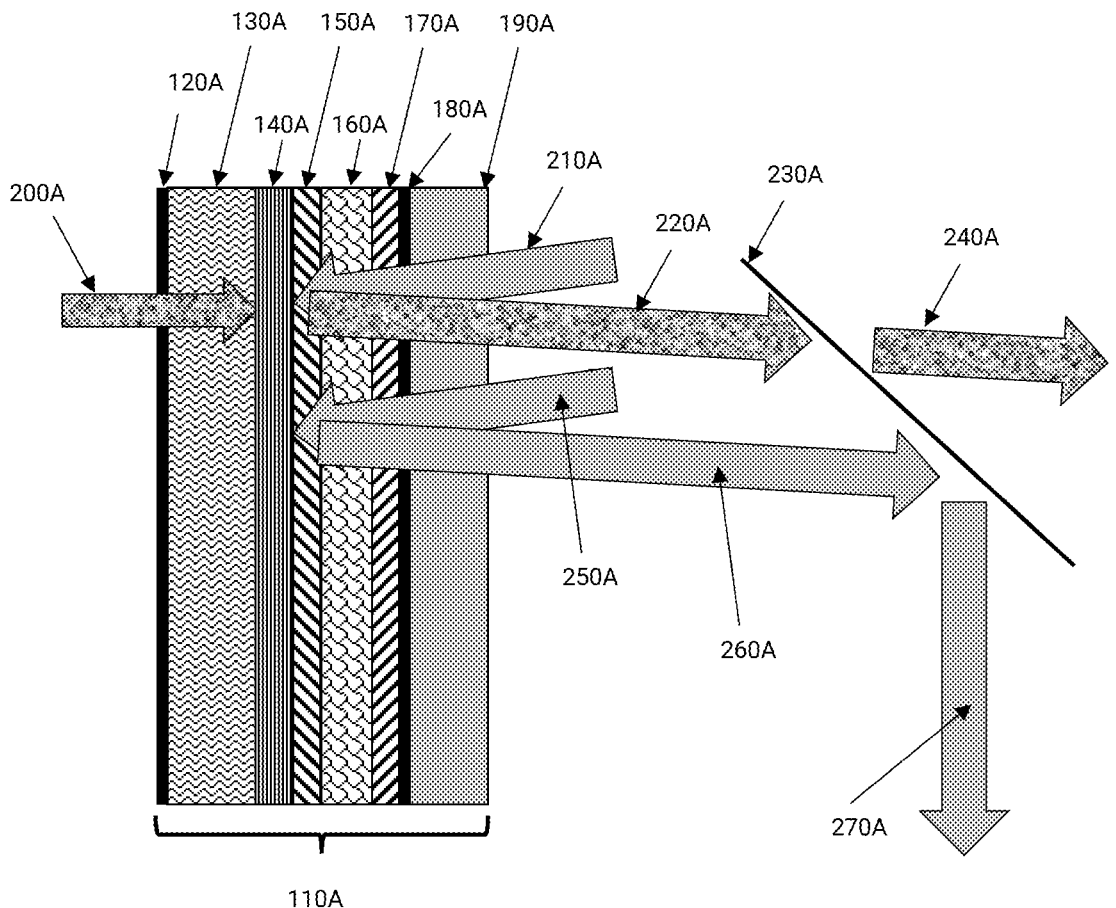

FIG. 1A illustrates an example of a speed reflective light valve (RLV) 100A for metal additive manufacturing. The RLV (110A) is composed of a top Transparent Conductive Oxide (TCO, 120A) which is deposited to the top of a photoconductor (130A). A high reflective mirror (140A) is deposited to the bottom of 130A and is >99.9% reflective for 990-1070 nm light and >75% reflective for 265-500 nm light. An alignment or impedance layer is deposited onto the interior side of 140A and is used to interface to a linear electro-optic (LEO, 160A). Another alignment or impedance layer (170A) is used to interface to 160A and is attached to the bottom TCO (180A), which is deposited onto the supporting substrate (190A).

A low fluence patterned write beam (200A) at $\lambda2$ passes through 120A, and into 130A causing 130A to reduce its resistance in a circuit composed of 120A, 130A, 140A, 150A, 160A, 170A and terminating at 180A. This electrical circuit is controlled by an external controller not shown. The change in resistance in 130A mirrors the intensity pattern in 200A and permits the non-patterned electric field seen at 120A to become a patterned field at 140A. This patterned field is also imposed across 160A which causes a change in this material's birefringence as seen by a high fluence laser beam (HFL, 210A) entering 110A. The high fluence beam (210A) is at $\lambda1$ and travels from right to left entering 110A by passing through 190A, 180A, 170A before it interacts with the patterned birefringence of 160A. The patterned birefringence of 160A imposes the pattern in 200A onto 210A as it passes through 160A. The HFL passes through 160A and 150A before reflecting off 140A and again passes through 160A, 170A, 180A, and 190A before leaving 110A as a patterned HFL in the form of 220A. The double pass through 160A requires that 160A is structured so that the double pass imposes the pattern that was on 200A onto 210A. Because the full effect of 160A is felt in a double pass method, its physical distance can be reduced by >50% allowing the speed to be increased by >4× over that of a standard transmissive LV. The patterned HFL beam (220A) passes through a beam pattern separator (230A) allowing the desired pattern 240A to be re-imaged into the print chamber while the unwanted pattern (not shown for clarity) is sent to either a beam dump or a switchyard system.

In the case where 200A is not present, an unpatterned HFL beam (250A) enters 110A and passes through 190A, 180A, 170A, 160A, 150A, reflects off of 140A and again transits 150A, 160A, 170A, 180A and 190A before leaving the 110A as an unpatterned HLF beam 260A. Upon striking 230A, it is fully rejected (as 270A) into either a beam dump or into a switchyard system such as later discussed with respect to FIG. 5.

Figure 1B:
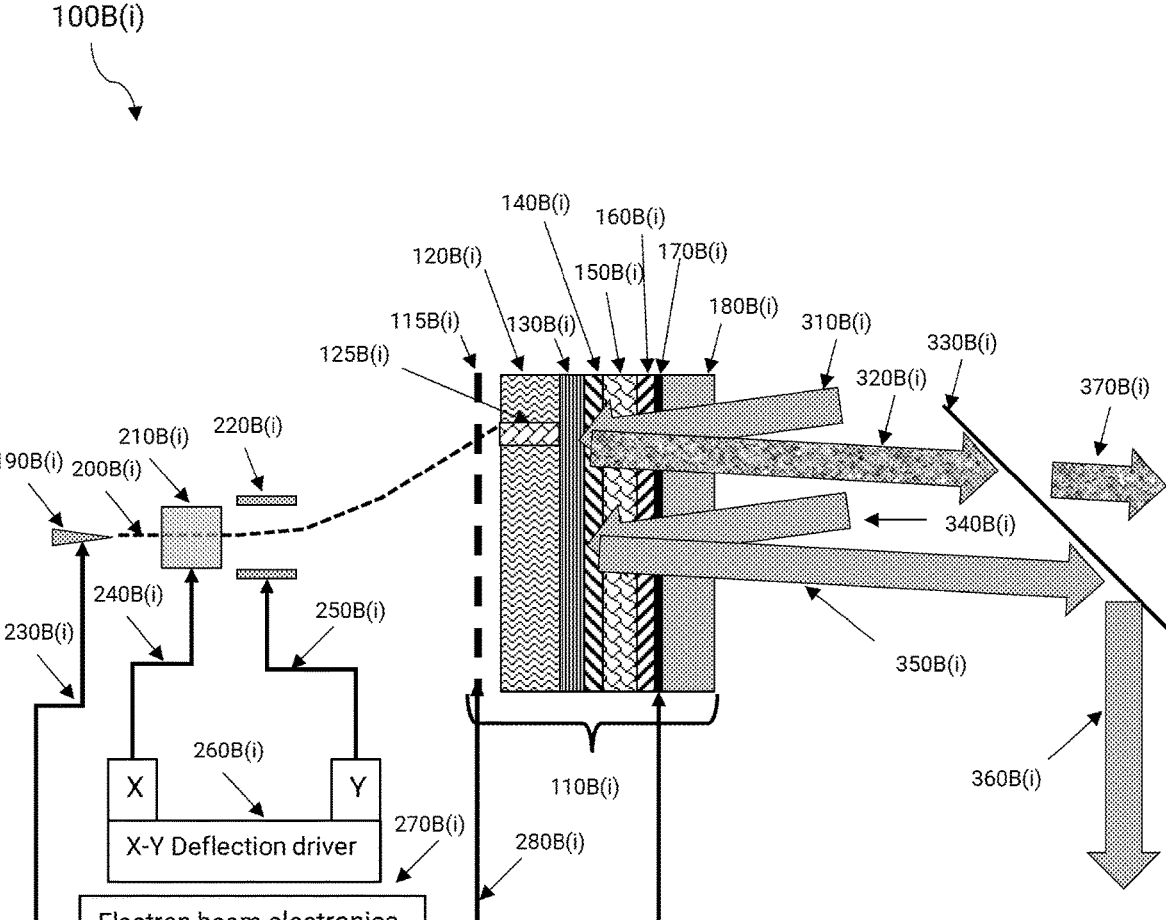
FIG. 1B(i) illustrates an example of a high speed electron beam addressed RLV (EBA-RLV)

FIG. 1B(i) illustrates an example of a high-speed electron beam addressed RLV (EBA-RLV) 100B(i). EBA-RLV 100B9(i) is composed of a secondary emission grid (115B(i)) which collects negative charges which either are scattered off the surface of the structured via array (120B(i)), emit from 120B(i) from a ballistic charge, or are pulled off as a function of 120B(i)'s voltage. 115B(i) allows 120B(i) to a charge 'pixel' defined by the electron beam to have a positive, neutral or negative charge and allows the pixel to be better defined than those systems without such a screen. The via layer (120B(i)) can be structured by being made of anisotropic matrix in which platelet conductive particles are scattered throughout its volume, a silicon or polymer based electrical via array commonly used in microelectronics as a fanout interlayer, or flex layer with similar arrangements of microscopic or nanoscopic through conduction paths. Attached to 120B(i) is a High Reflective Mirror (HRM, 130B(i)) which is >99% reflective for 990-1070 nm light. Attached to 130B(i) is an alignment or impedance layer (140B(i)) which sets up the orientation of the Linear Electro-Optic layer (150B(i)). An additional alignment/impedance layer (160B(i)) aids in defining the orientation of 150B(i). A Transparent Conductive Oxide (TCO, 170B(i)) terminates 110B(i)'s electrical circuit composed of 115B(i), 120B(i),

130B(i), 140B(i), 150B(i), and 160B(i). A supporting substrate (180B(i)) provides stability for 110B(i).

The electron source which defines a pixel in 110B(i) is generated by an electron gun (can also be a tunneling electron source, a Spindt type cold cathode emitter or similar electron beam generator) which emits a stream of free electrons (200B(i)). Deflection and focusing structures allow the beam to be swept in the "x" (210B(i)) and "y" (220B(i)) directions across the face of 115B(i), which in tandem with 115B(i) defines charged pixels in 120B(i) and varying voltage fields across 150B(i). Modulating the strength of 200B(i) along with the waveform imposed on 115B(i) allows for gray scale imagery to be imposed on 150B(i). The current and voltage control for 190B(i) is conveyed to 190B(i) by way of control line 230B(i) from the electron beam electronics module (270B(i)). Likewise, the control of the voltage waveform for 210B(i) and 220B(i) are conveyed by control lines 240B(i) and 250B(i), respectively from 260B(i) (X-Y deflection driver) controlled by 270B(i). In addition, 270B(i) controls the voltage and current waveform of 115B(i) by way of 280B(i) control line. 270B(i) is controlled by the LV electronics module (290B(i)) which also controls the voltage waveform of 170B(i) by way of 300B(i) control line.

Operation of 110B(i) as a light valve requires that an unpatterned high fluence beam (310B(i)) enters 110B(i) by passing through 180B(i), 170B(i), 160B(i), 150B(i) 140B(i) and reflecting off 130B(i) before traversing 140B(i), 150B(i), 160B(i), 170B(i) and exiting 180B(i). The charge image that is deposited by the raster scanning 200B(i) across 115B(i) and 120B(i) is transferred as a voltage image across 150B(i). This voltage image acts upon 150B(i) causing its optical response to change. The optical response of 150B(i) is usually a change in its birefringence but can also be a phase change, spectral, scattering, absorption, or reflection response as seen by 310B(i). The voltage image imposes an optical response image on 150B(i), the double passage of 310B(i) through 150B(i) imposes that image onto 310B(i) changing it to a patterned HFL beam (320B(i)). 320B(i) passes out of 110B(i) and strikes the beam pattern separator (330B(i)) which splits the desired pattern image (370B(i)) from the undesired image. The desired image (370B(i)) is relayed to the print chamber while the undesired image (not shown) goes to either a beam dump or a switchyard system.

In the situation where an unpatterned HLF beam (340B(i)) enters 100B(i) where there is no image presented by the electron beam system, this light is not affected and not patterned by 110B(i) and exits unpatterned (350B(i)) and upon striking 330B(i), is diverted into 360B(i) as it is sent to either a beam dump or a switchyard system. The frame rates of an EBA-RLV system can exceed E6 frames per second and would be likely limited by the switch time of 150B(i) than the capabilities of the scanning electron beam electronics.

FIG. 1B(ii) illustrates an example of an embodiment to an EBA-RLV 100B(ii) incorporating an electron beam array. Light valve 110B(ii) is activated by a 2D addressable electron emitters (120B(ii)) which contain rows and columns of separately addressable field emitters (125B(ii)) in an active matrix arrangement. Activation of one such emitter (125B(ii)) allows electron emission (127B(ii)) to be locally deposited onto 110B(ii) so that a charged pixel (130B(ii)) is generated and a modification of the LEO layer within 110B(ii)) is affected. The row and column addressing of 120B(ii) is controlled by an electron beam array driver(160B(ii)) and is conveyed to 120B(ii) by control lines 140B(ii) (column control lines) and 150B(ii) (row control lines). A LV electronics controls 160B(ii) including the voltage waveform imposed on the TCO inside 110B(ii) via the control line 180B(ii). As described in FIG. 1B, an incoming unpatterned HFL (190B(ii)) enters 110B(ii) and leaves as a patterned HFL (200B(ii)) wherever an electron beam pixel has been activated. 200B(ii) is split by beam pattern separator (210B(ii)) into the desired patterned HFL beam (220B(ii)), which is imaged to the print chamber, and an undesired pattern that goes into a beam dump or a switchyard system. If an unpatterned HFL beam (230B(ii)) enters 110B(ii) where there is no electron beam pixel is activated, it will leave 110B(ii) as an unpatterned HFL beam (240B(ii)) and be totally rejected by 210B(ii) and be directed to either a beam dump or a switchyard system as 250B(ii). The frame rate of a 2D addressable EBA-RLV is limited by the array drivers, typically in the E2 frames per second.

FIG. 1B(iii) illustrates an example of an embodiment to an EBA-RLV 100B(iii). incorporating a photoconducting separating layer between the gate anode and the tip entrance and making the base of the cathode emission array transparent to a write beam. This effectively converts a EBA-RLV into an optically addressed EBA-RLV as shown in 110B(iii). The EBA-RLV (110B(iii)) components is described in FIG. 1B. In this embodiment the scanning electron beam is replaced by an optically addressed cold cathode emitter array (113B(iii)) which includes a photoconductor (120B(iii)) separating the anode from the tip support structure. In this embodiment, a patterned write beam (115B(iii)) at λ2 passes through 113B(iii) and activates the photoconductor 125B(iii) allowing the tip directly below 125B(iii) to emit a stream of electrons (127B(iii)) which creates a patterned charged area (130B(iii)) within 110B(iii) that mirrors the pattern in 115B(iii). The charged pattern transfers a voltage from the outside of 110B(iii) to across the LEO layer within 110B(iii). The control lines 140B(iii), 150B(iii), and 153B(iii) which control the voltage waveforms impressed onto the cold cathode array, the photoconductor anode layer, and the secondary emission grid within 110B(iii), respectively. The electron beam array electronics (155B(iii)) control the waveforms on 140B(iii), 150B(iii), and 153B(iii) and works in conjunction with the LV electronics (157B(iii)) which also controls the waveform delivered to the TCO inside 110B(iii) via control line 160B(iii).

The desired pattern is imposed onto the HFL beam by initially having an unpatterned HFL beam (170B(iii)) enter 110B(iii) and interact with the LEO that has been activated by 115B(iii) by way of 126B(iii), 127B(iii) and 130B(iii). The LEO impresses the same pattern as that inherent in 115B(iii) onto 170B(iii) and upon reflection off 110B(iii)'s HRM, leaves 110B(iii) as a patterned HFL beam (180B(iii)). The patterned HFL beam (180B(iii)) strikes the pattern separator (190B(iii)) and the desired beam (200B(iii)) is relayed to the print chamber while the unwanted pattern goes into either a beam dump or a switchyard system. As is in prior cases, an unpatterned HFL beam (210B(iii)) entering 110B(iii) in an area not activated, the beam reflects of the HRM inside 110B(iii) and leaves the EBA-RLV still unpatterned as 220B(iii) where it is fully rejected by 190B(iii) and becomes 230B(iii) which goes into either a beam dump or a switchyard system. The benefit of 100B(iii) is that the frame rate is dependent on the speed at which 115B(iii) and the LEO material can be switched and in the case for LiNbO3 as the LEO material and a fast DLP system as the source for 115B(iii), 100B(iii) is limited to the 50-100 KHz frame rate limitation inherent in the DLP system.

Figure 1C:
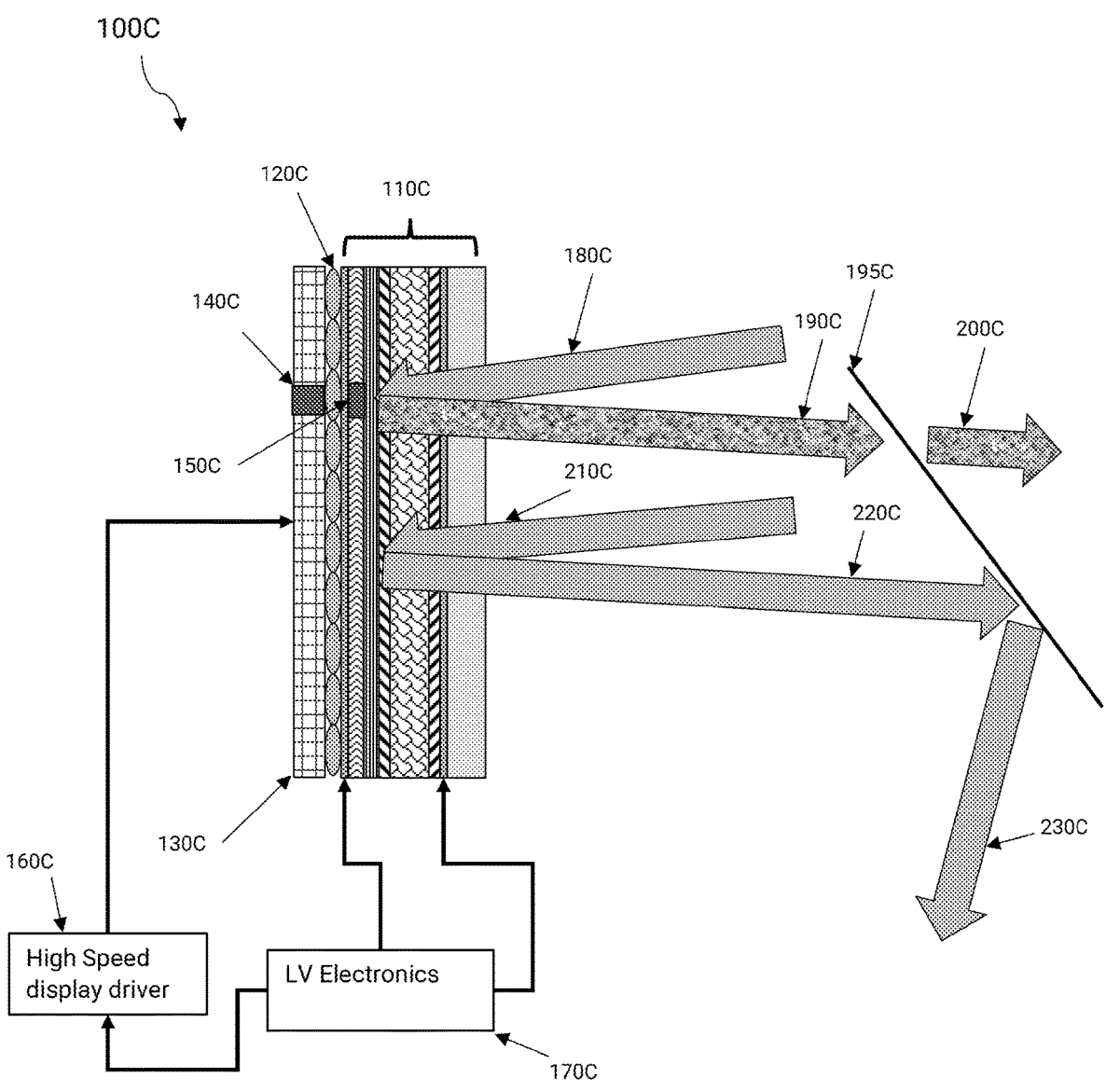
FIG. 1C illustrates an example of a high-speed directly coupled self-emissive display addressed RLV (e-RLV)

FIG. 1C illustrates an example of a high-speed directly coupled self-emissive display addressed RLV (e-RLV)

100C. The RLV (110C) is directly coupled to a self-emissive display (130C) operating at λ2. The optical coupling between 130C and 110C is performed by either a lenslet array (120C), an aperture array or by similar proximity focusing (butt coupling the surface of 130C directly to a thin photoconductor layer within 110C). The self-emissive display can be an OLED, an array of LEDs (driven as a display), a microLED display or any variety of surface emitting displays that can emit at λ2 (being in the 265 nm to 500 nm band). The light emitted by a set of pixels which form a patterned beam (140C) within the 130C causes the photoconductor element in direct contact or coupled via 120C to transfer the voltage on the outside of 110C to be across the LEO layer inside 110C and impose a change to the LEO's optical properties as described above. The self-emissive display is controlled by a high-speed display drive (160C) through the control lines 150C while 110C is controlled by LV electronics (170C) as described previously. An unpattern HFL beam (189C) enters 110C, passing through the LEO layer in the region which is affected by 150C which is addressed by 140C. The image imposed by 140C is transferred to 180C through the action of 150C on the LEO layer and as 180C reflects of the HRM layer inside 110C and passes through the LEO layer and the intermediate layers, it exits as a patterned HFL beam, 190C. The desired pattern (200C) in 190C is separated out by the action of the beam pattern separator (190C) which is then imaged to the print chamber. The undesired pattern (not shown) reflects off of 195C and is imaged into a beam dump or into a switchyard system. In the case where there is no pattern or light emitted from 130C, an unpatterned HFL beam 210C, travels through 110C and does not exit patterned by the action of the LEO as there is no activation from 130C; it leaves 130C as an unpatterned HFL beam (220C) and is totally rejected by 195C and is imaged either into a beam dump or a switchyard system as waste light (230C). The frame rate attainable by 100C is dependent on the LEO layer inside 110C as well as the switching speed of 130C, both typically >1000 frames per second.

Figure 1D:
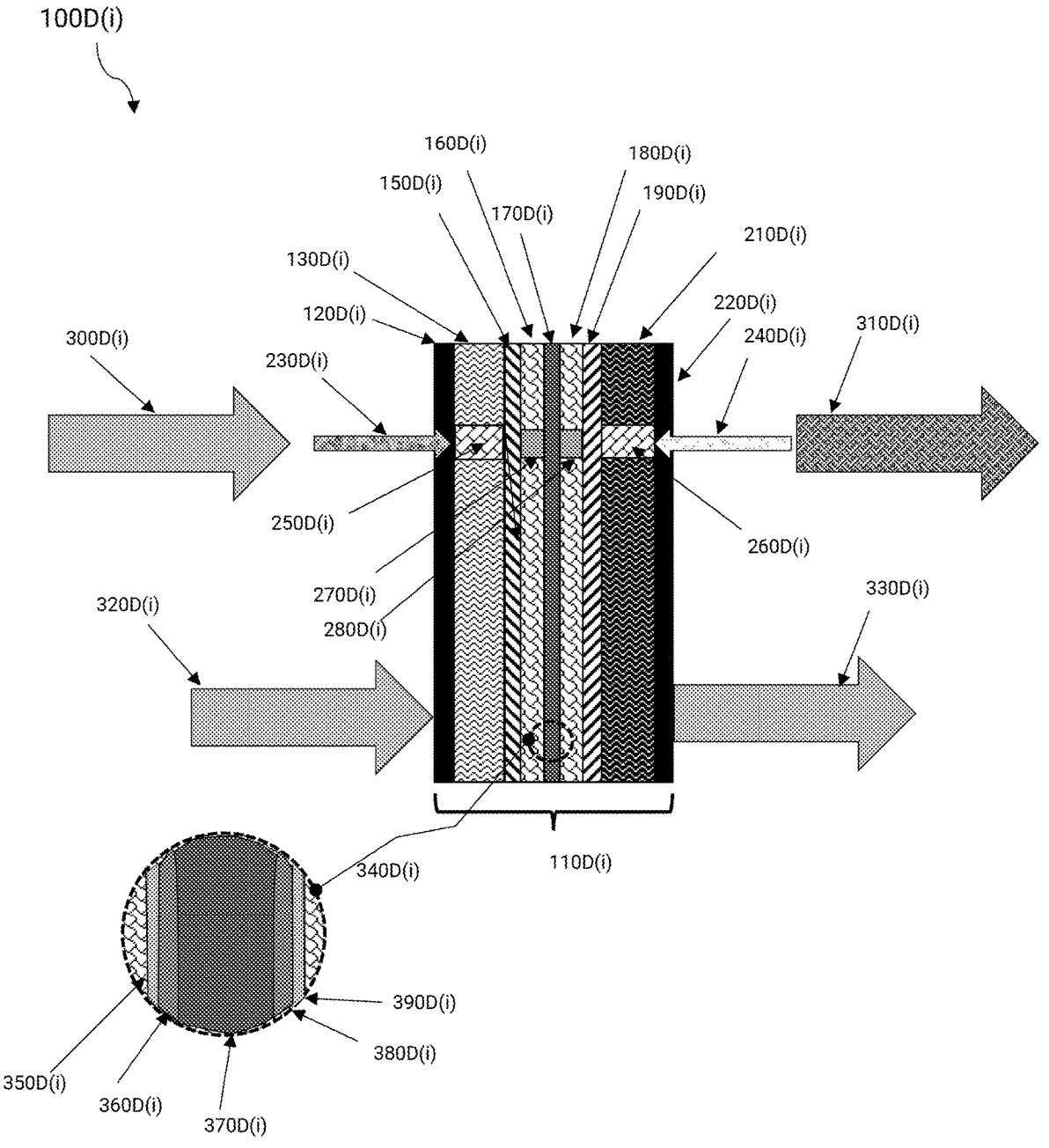
FIG. 1D(i) illustrates an example of a high-speed dual photoconductor LV

FIG. 1D(i) illustrates an example of a high-speed dual photoconductor LV (DPCLV) 100D(i). The DPCLV includes a top Transparent Conductive Oxide (TCO, 120D(i)), a top photoconductor layer (PC, 130D(i)), a top impedance/alignment layer (IML, 150D(i)), a top linear electro-optic layer (TLEOL, 160D(i)), an intermediate layer group (170D(i), shown in more detail in 340D(i)), a bottom LEOL (B-LEOL, 180D(i)), a bottom IML (190D(i)), a bottom PC layer (210D(i)), and a bottom TCO (220D(i)).

The DPCLV system (110D(i)) works by the dual action of two counterpropagating patterned write beams, both at λ2, that come into 110D(i) from the right (230D(i)) and from the left (240D(i). The patterned write beam entering 110D(i) from the right (230D(i)) activates 130D(i) to form a patterned voltage image inside 130D(i) which is transferred into 160D(i) through the response by the T-LEOL to this patterned voltage variation (270D(i)). Likewise, the patterned write beam entering 110D(i) from the left (240D(i)) performs the same transfer into the B-LEOL by way of 260D(i) and 280D(i). A unpatterned HF1 beam (300D(i)) at λ1 enters 110D(i), passing through and interacting with the pattern response of 270D(i) and 260D(i), leaving 110D(i) as a patterned HFL beam 310D(i) through its interacts with these two LEOLs. Similarly, in areas of 110D(i) that are not patterned by 230D(i) and 240D(i), an unpattern HFL beam (320D(i)) passes through 110D(i) without being affected by the LEOLs becoming 330D(i)—a sill unpatterned HFL beam. The patterned 310D(i) is imaged to the print bed after passing through a beam pattern separator (not shown) with the desired image going on to the bed while the undesired pattern as well as 330D(i) are rejected and are imaged into a beam dump or into a switchyard system such as discussed with respect to FIG. 5.

The intermediate layer group (170D(i)) within 110D(i) is shown in detail as 340D(i). This structure acts an intermediate support for 160D(i) and 180D(i) and is composed of an intermediate Top IML (350D(i)), an intermediate top TCO (260D(i)), a intermediate support layer (370D(i)), an intermediate bottom TCO layer (380D(i)), and a intermediate bottom IML (390D(i)).

Due to the reduction in the LEOLs to half or less than that of a standard transmissive LV, the switching speed can be increased by >4× over that of a standard high-speed transmissive LV.

FIG. 1D(ii) illustrates an example of a high-speed dual photoconductor LV100D(ii) utilizing fringe field switching. A fringe field switching LEOL system uses different types of linear electro-optic materials in which the material's optical properties (notably, its birefringence) is activated by electric field gradients. These gradients are due to fringe fields between two adjacent activated regions. The fringe fields are typically higher in local field strength and have a larger effect on the LOELs; consequently, the LEOL thicknesses can be dramatically reduced with a commensurate increase in frame rate as the square of the thickness reduction over normally operating LVs. In this embodiment, the fringe fields are created by using a dual photoconductor concept introduced in FIG. 1D. An exemplary of fringe field DPCLV is depicted in 110D(ii) and is composed of a top TCO (120D(ii)), a top photoconductor (130D(ii)), a top IML (140D(ii)), a LEOL (150D(ii)), a bottom IML (160D(ii)), a bottom photoconductor (170D(ii)) and a bottom TCO (175D (ii)).

A patterned write beam (at λ2) 180D(ii) enters 110D(ii) from the left and imposes a voltage pattern (200D(ii)) inside 130D(ii). A second patterned write beam (carrying the same image, 190D(ii)) enters from the right and enters 110D-I slightly displaced from being collinear and counterpropagating with 180D(ii) and imposes a voltage pattern (210D (ii)) inside 170D(ii). The fringe fields inside 150D(ii) created by the offset between the two voltage patterns (200D(ii) and 210D(ii)) actuate the LEO inside 150D(ii) to create a pattern optical response in 150D-I depicted as 250D(ii) (details of the voltage fringe fields in 130D(ii) and 170D(ii) were left out for clarity). A unpatterned HFL beam (240D (ii)) enters 110D(ii) and the optical response pattern in 250D(ii) is imposed onto 240D(ii) so that upon leaving 110D(ii), the HFL beam becomes patterned (260D(ii)) with the same spatial imagery contained in both 180D(ii) and 190D(ii). The desired pattern within 260D(ii) is imaged to the print chamber while its undesired pattern is imaged into a beam dump or into a switchyard system such as discussed with respect to FIG. 5.

The two write beams (180D(ii) and 190D(ii)) do not have to carry the same imagery, fringe fields will be set up regardless of the imagery presented on each channel; the response on 240D(ii) will be as described above but with the final pattern imposed on 260D(ii) being a convolution of the two images contained in 180D(ii) and 190D(ii). Additionally, 150D(ii)'s response to the fringe fields created by 200D(ii) and 210D(ii) depends on both fields being present in the same time interval. The overlap in time of 180D(ii) and 190D(ii) provides an additional speed improvement and is dependent on the relaxation times of 150D(ii) and the two photoconductors (130D(ii) and 170D(ii)), providing a fast LV.

Figure 5:
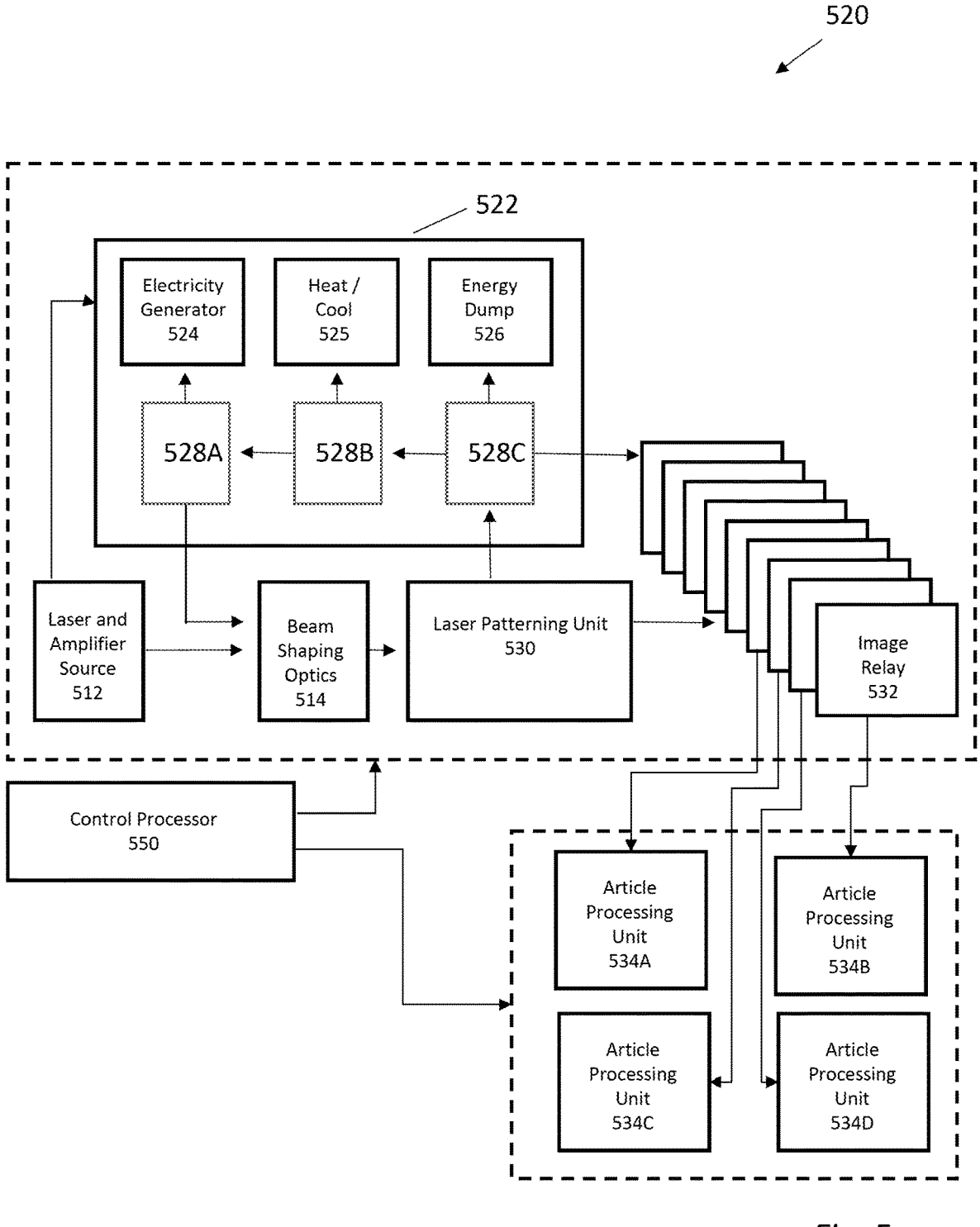
FIG. 5 illustrates another embodiment of a high fluence high speed light valve based additive manufacturing which incorporates a switchyard approach for recovery and further usage of waste energy.

In the case where there is one write beam or an absence of both write beams (180D(ii) and 190D(ii)) and an unpatterned HFL beam (270D(ii)) enters 110D-I, no pattern optical response is contained in 150D(ii) and 270D(ii) leaves 110D(ii) as an unpatterned HFL beam (280D(ii)) that will be imaged into a beam dump or into a switchyard system such as discussed with respect to FIG. 5.

Figure 1E:
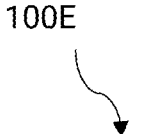
FIG. 1E illustrates an example of a high-speed LV utilizing in-plane switching.
Figure 1E:
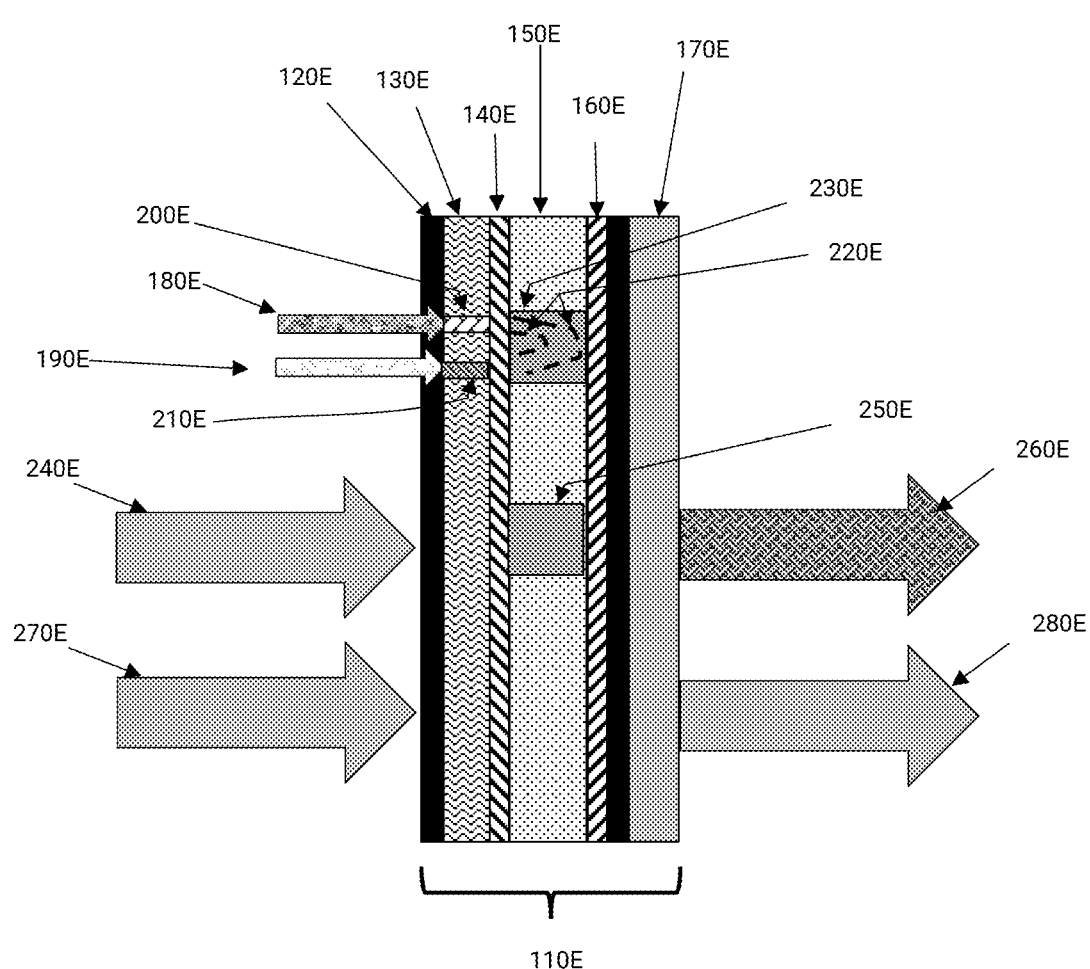

FIG. 1E illustrates an example of a high-speed LV 100E utilizing in-plane switching. LV 110E is composed of a top TCO (120E), a photoconductor (130E), a top IML (140E), a LEO layer (150E), a bottom IML (160E) and a supporting substrate (170E). The 150E is composed of a material which reacts to fringe fields and is typically an electrically controlled birefringent liquid crystal (ECB-LC) that has been vertically aligned (VA). An in-plane LC system can be extremely thin, but this condition places the need for the LCs in this class of device to have a very large birefringence to allow a sufficient contrast ratio to be practical. Since the frame speed of an LC based LV goes as the square of the thickness reduction over nominal LVs, the frame speed can be 1-2 orders larger than nominal.

The activation of 110E originate with two patterned write beams (180E and 190E), both operating at λ2 and entering 110E from the left, passing into 130E where they generate two voltage patterns (200E and 210E) within 130E. The field interference pattern between 200E and 210E generates in-plane fringe fields between the two patterns just past 140E and into 150E, represented by 220E. The in-plane fringe fields modify the LEO material within 150E (230E) according to the interference field 220E and imposes an optical response within 230E that mirrors the images contained in 180E and 190E.

A HFL beam (240E) enters 110E from the left and interacts with a patterned section of 150E caused by in-plane switching between two similarly created interference as described above (depicted as 250E), the details of its presentation to 150E is omitted for clarity. The pattern optical response in 150E (250E) imposes the pattern onto 240E and it leaves as a patterned HFL beam (260E) with the desired portion of this patterning continuing to the print chamber and the undesired portion going into a beam dump or into a switchyard system. In the case where on or both write beams are absent, an unpatterned HFL beam (270E) interacts with an unpatterned 150E volume leaving 110E still unpatterned as 280E and is imaged either into a beam dump or into a switchyard system such as discussed with respect to FIG. 5.

Figure 1F:
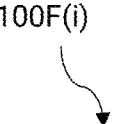
FIGS. 1F(i) and 1F(ii) together illustrate an example of an architecture for high speed LV system (HSLV unit) 100F(i) and its timing 100F(ii)
Figure 1F:
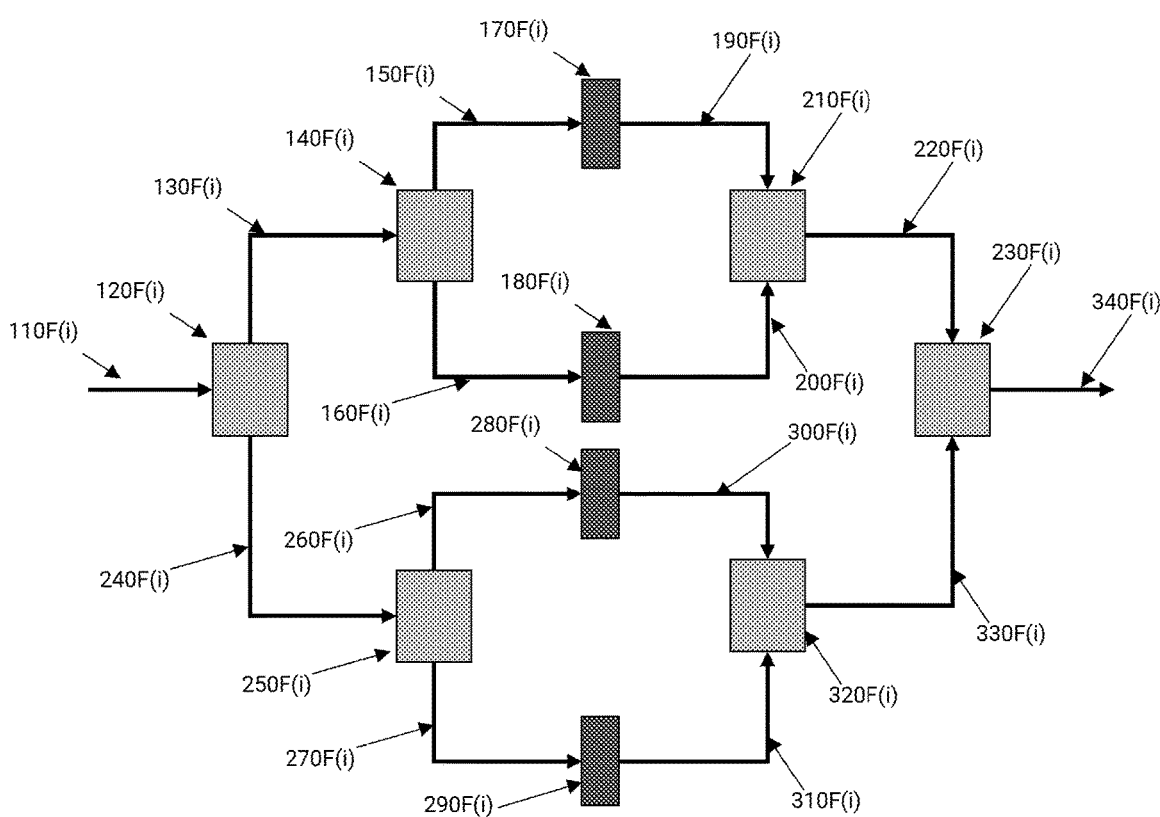

FIGS. 1F(i) and 1F(ii) together illustrate an example of an architecture for high speed LV system (HSLV unit) 100F(i) and its timing 100F(ii). In this schematic layout, there are high speed areal LV (aka as PI-cell) switches and low speed patterning LVs, there is also supporting optics to realize this architecture which is omitted for clarity. An unpatterning HFL beam (110F(i)) enters 100F(i) and is switched by PI cell 120F(i) into one of two possible paths/channels, either 130F(i) or 240F(i). Assume that 120F(i) switched the incoming 110F(i) into 130F(i) channel, the unpatterned HF(i)L beam enters the 2nd tier of unpatterned PI cell (140F(i)) which can put the 130F(i) into one of two paths/channels, either 150F(i) or into 160F(i). Assume that 140F(i) was activate so that unpatterned HFL beam on 130F(i) is switched into the 150F(i) channel. The unpatterned HFL beam, 150F(i), enters a patterning LV 170F(i) and gets patterned during time slot t1. The patterned HF(i)L beam leaves 170F(i), travelling along path 190F(i) where it is switched into 220F(i) by a non-patterning 3rd tier PI cell (210F(i)). The patterned HFL beam travels along 220F(i) and into the 4th tier non-patterning PI cell (230F(i)) which integrates the various signals onto channel 340F(i) where it is imaged to the print chamber in time slot t1.

Similarly, the paths that take the unpatterned HFL from 110F(i), through 120F(i) and into 130F(i), through 140F(i) and into 160F(i) which allows the unpatterned HFL beam to be patterned by the patterning LV 180F(i) at time t2. The output of 180F(i) travels along 200F(i) into 210F(i) which places the patterned HFL beam 200F(i) onto 220F(i) which again allows 230F(i) integrates that image onto 340F(i) in time slot t2 to be sent to the print chamber.

In a similar manner the initial unpatterned HFL beam can be sent to patterning LV 280F(i) (at time t3) by way of PI cell, 250F(i), along the paths 240F(i) and 260F(i). The patterned HFL result from 280F(i) travels along 300F(i) and is integrated into 340F(i) (at time slot t3) by way of PI cells, 320F(i) and 230F(i), along paths 300F(i) and 330F(i). In a similar fashion, the unpatterned HFL beam can be patterned by the patterning LV 290F(i) in time slot t4 by traversing 240F(i) and 270F(i) through PI cell 250F(i). The integration of the patterned HFL output from 290F(i) (310F(i)) into 340F(i) in time slot t4 is accomplished by traversing paths 310F(i) and 330F(i) and passing through 320F(i) and finally 230F(i). The sequence coming out of 230F(i) patterned HFL beams originating from patterns placed onto it by 170F(i), 180F(i), 280F(i), and 290F(i) in time slots t1, t2, t3, and t4, respectively thus creating a 4× improvement over a the frame rate that could be achieved if only one patterning LV were used.

The timing sequence is demonstrated in 350F(i) where 360F(i) is the timing sequence of 120F(i) (the 1st tier of PI cell). The 2nd tier of PI cell (140F(i) and 250F(i)) has timing diagrams depicted in 370F(i) and 420F(i), respectively. The slow patterning LVs (170F(i), 180F(i), 280F(i) and 290F(i)) have timing diagrams of 400F(i), 410F(i), 430F(i) and 440F(i), respectively. The 3rd tier of PI cells (210F(i) and 320F(i)) having timing diagrams depicted in 380F(i) and 450F(i), respectively. The 4th tier of PI cell (230F(i)) has a timing diagram depicted in 390F(i). The timing diagram of the output of the high-speed LV system (channel 340F(i)) is depicted in 460F(i). Comparing the frame rate (480F(i)) of an individual patterning LV (seen as a dotted box around the timing of 400F(i)) and comparing that to the frame rate for the LV system (dotted box 490F(i)), it can be seen that the LV system has a frame rate that is 4× faster for a 2-tier up/down system. This architecture allows for 2N speed improvement over single LV systems where N is the number of tiers of PI cells prior/post to the patterning LVs in the system. This architecture requires that the PI cells be >4× the switching speed of the slow patterning LVs. The arrangement depicted in 100F(i) is a unit of a high-speed binary switch LV system.

FIG. 1F(iii) illustrates an example of use of multi-point LVs switches 100F(ii) for the high speed LV system of FIG. 1F(i). A single high-speed multi-point non-patterning LV switch is used for both input and output gates that feed into/out of a 1D or 2D array of slow patterning LVs. An unpatterned HFL beam (110F(i)) enters a multi-point scanning/staring LV (120F(i)) and is scanned to any one of an array of slow patterning LVs depicted as 160F(i). on either side of 160F-I is a prismatic array that takes the angled unpatterned HFL (130F(i)) and straightens it out so as to optimize the spatial resolution of any one patterning LV in 160F(i). Since each patterning LV is at a precise position with respect to 120F-I, 150F(i) can be a static array of prismatic components. The HFL gets patterned by any one patterning LV within 160F(i) at a time slot ti before passing through another prismatic array (170F(i)). The second prismatic array (170F(i)) deflects the patterned HFL beam (180F(i)) into the second non-patterning high-speed multi-point LV which is set up to redirect 180F(i) into the output channel of 100F(i) to form one part of the train of patterned pulses imaged to the print chamber. While 130F(i) and 180F(i) represents the 1st channel into and out of (respectively) the pattern LV array, the last channel into and out of this array is represented by 140F(i) and 190F(i) (respectively).

There are several different ways for the channel selection to be performed with this arrangement, sequential from the 1st channel (130F(i)/180F(i)) to the last (140F(i)/190F(i)) or any variation there in including not starting with 130F(i)/180F(i) or ending with 140F(i)/190F(i). The frame speed improvement of this method over that of a standard (single) LV system is equal to the number of unique and controllable pointing directions that 120F(i)/200F(i) can perform (Mx). Additionally, this method requires 120F(i)/200F(i) is Mx faster than any on of the slow patterning LVs in 160F(i), where M is equal to the number of unique addressable directions that 120F(i)/200F(i) can attain. The arrangement of 100F(i) is a unit of a high-speed multi-point switch LV system.

Figure 1G:
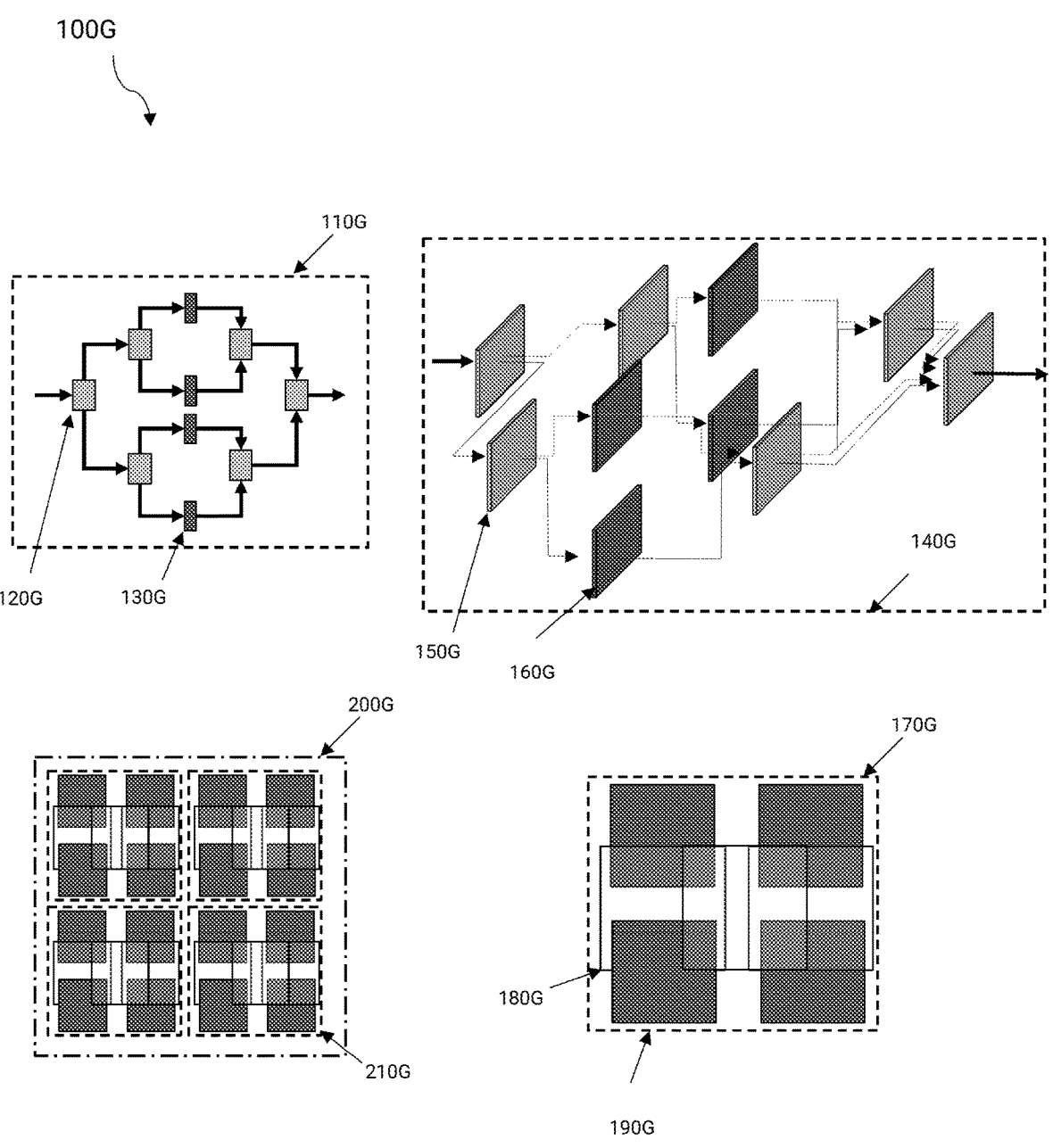
FIG. 1G illustrates an example of an architecture using an array of HSLV units.

FIG. 1G illustrates an example of an architecture using an array of HSLV units 100G. Note that while a schematic for the binary high-speed architecture (110G) is used illustrated, multi-point embodiments can also be used. The binary switched LV system contains a non-patterning high speed areal LV switch (exemplified by 120G) and a slow patterning LV (exemplified by 130G). A 3D representation of 110G is depicted in 140G where 150G and 160G equates to 120G and 130G, respectively. An end-view of 140G is depicted in 170G where 180G and 190G equates to 120G and 130G, respectively. This unit cell of the high-speed LV system can be arrayed (200G) in which 210G represents one such unit. The arraying of 170G into 200G allows the concept of high-speed LV systems to be extended in space to realize a high speed areal printing engine, an alternative architecture for switchyard such as discussed with respect to FIG. 5, or a solid state scanning system.

A wide range of lasers of various wavelengths can used in combination with the described phase change light valve system. In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO$_4$) laser, Neodymium doped yttrium calcium oxoborateNd:YCa$_4$O (BO$_3$)$^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride(Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

Figure 2:
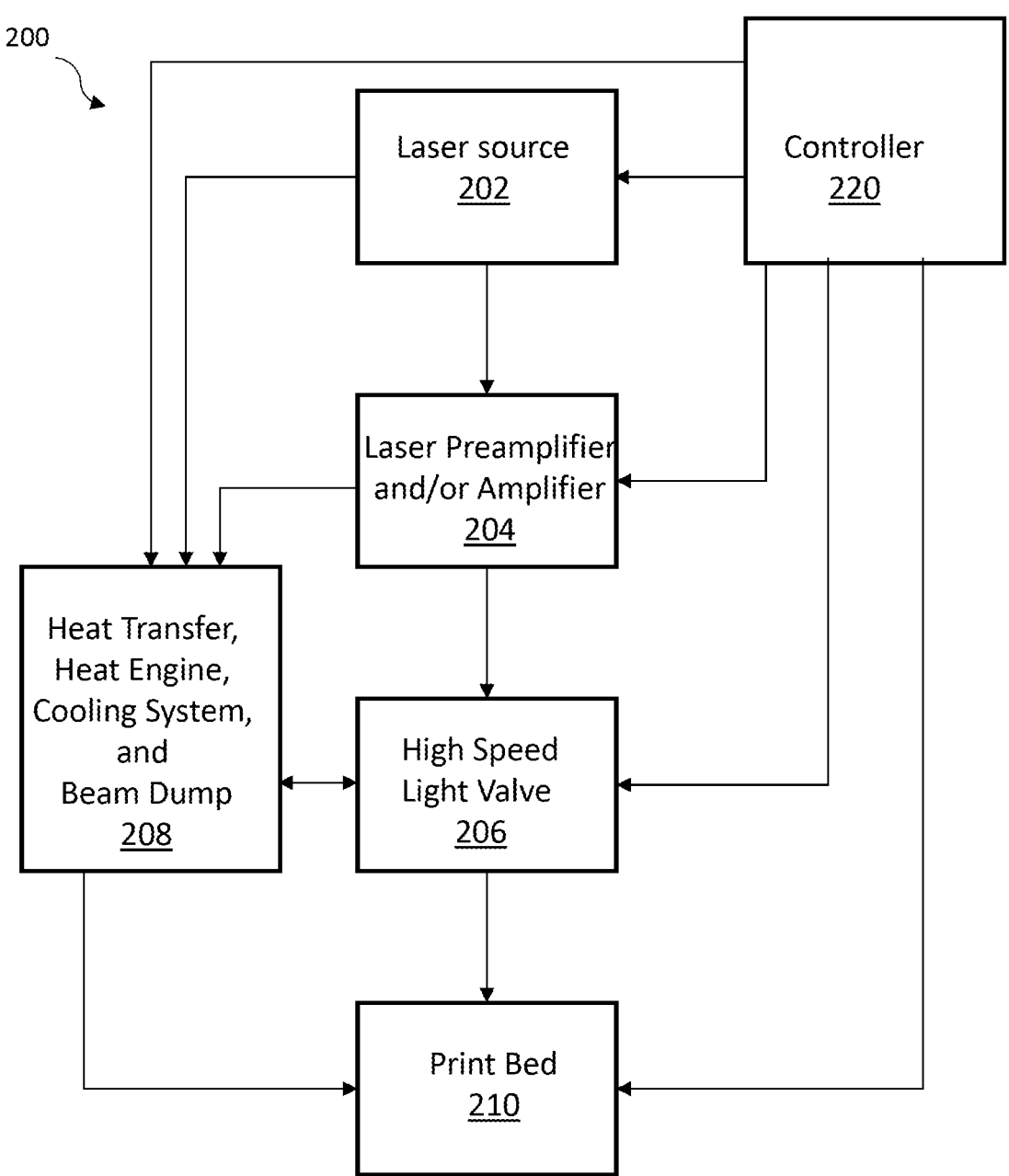
FIG. 2 illustrates a block diagram of a high fluence light valve based additive manufacturing system supporting a beam dump, a high speed light valve, and a heat engine.

FIG. 2 illustrates use of a high speed light valves such as disclosed herein in an additive manufacturing system 200. A laser source 202 directs a laser beam through a laser pre-amplifier and/or amplifier 204 into a high speed light valve 206. After patterning, light can be directed into a print bed 210. In some embodiments, heat or laser energy from laser source 202, laser preamplifier and/or amplifier 204, or an high speed light valve 206 can be actively or passively transferred to a heat transfer, heat engine, cooling system, and beam dump 208. Overall operation of the light valve based additive manufacturing system 200 can controlled by one or more controllers 220 that can modify laser power and timing.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers will typically be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 204 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped. Both thermal energy and laser energy generated during operation can be directed the heat transfer, heat engine, cooling system, and beam dump 208.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, thermal energy and laser energy generated during operation of system 200 can be directed into the heat transfer, heat engine, cooling system, and beam dump 208. Alternatively, or in addition, in some embodiments the beam dump 208 can be a part of a heat transfer system to provide useful heat to other industrial processes. In still other embodiments, the heat can be used to power a heat engine suitable for generating mechanical, thermoelectric, or electric power. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
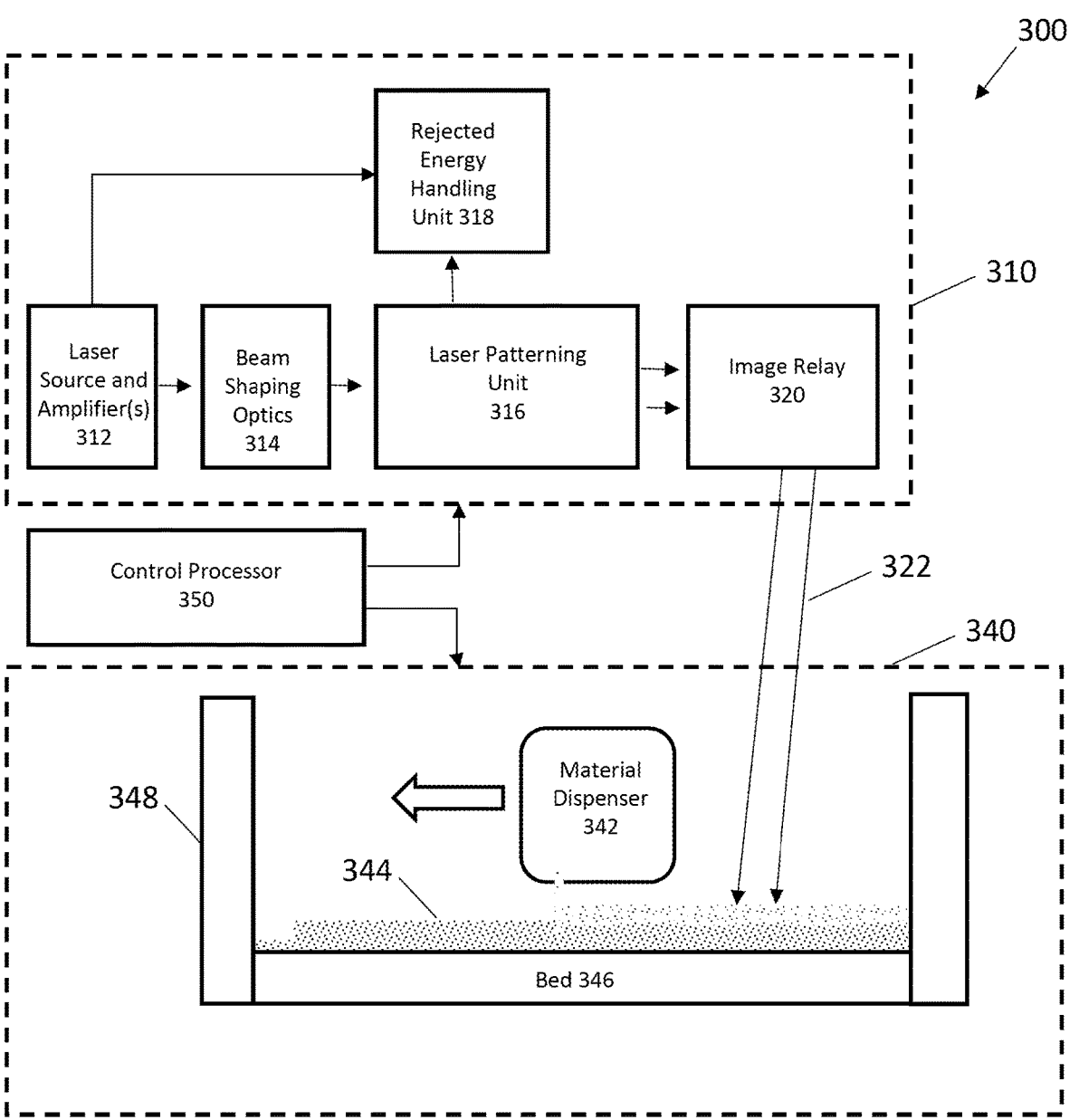
FIG. 3 illustrates a high fluence high speed light valve based additive manufacturing system.

FIG. 3 illustrates an additive manufacturing system 300 that can accommodate high speed light valves as described in this disclosure. As seen in FIG. 3, a laser source and amplifier(s) 312 can include resonance based light valves and laser amplifiers and other components such as previously described. As illustrated in FIG. 3, the additive manufacturing system 300 uses lasers able to provide one or two dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. The rejected energy handling unit can utilize heat provided by active of cooling of light valves.

Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source, light valve(s), and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for dispos-able or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2,$C_4H_7$, 1,3-$C_4H_6$, 1,2-C4H6, $C_5H_{12}$, n-$C_5H_{12}$, i-$C_5H_{12}$, n-C6H$_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$—$CH_3$, $C_8H_{10}$, $C_2H_5OH$, $CH_3OH$, i$C_4H_8$. In some embodi-ments, refrigerants or large inert molecules (including but not limited to sulfur hexafluoride) can be used. An enclosure atmospheric composition to have at least about 1% He by volume (or number density), along with selected percent-ages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufac-ture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advanta-geously, as compared to a vertically moving the build platform, large and heavy objects can be more easily manu-factured, since precise micron scale movements of the ever changing mass of the build platform are not needed. Typi-cally, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occu-pied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capabil-ity can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentra-tions below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and char-acterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
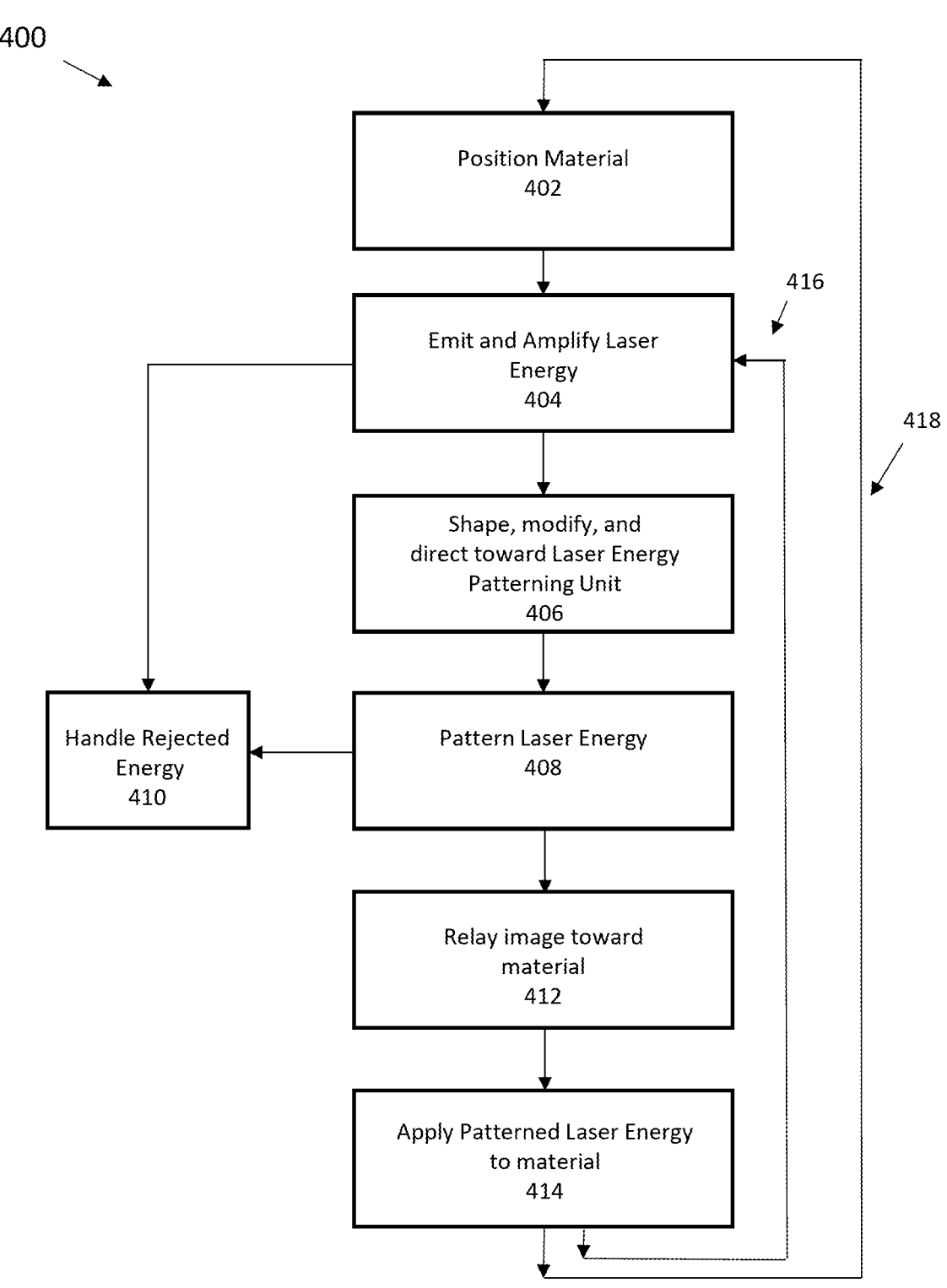
FIG. 4 illustrates another embodiment of a high fluence high speed light valve based additive manufacturing system.

One embodiment of operation of a manufacturing system supporting use of a high speed light valve suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned by a high speed light valve, with energy not forming a part of the pattern being handled in step 410 (this can include use of a beam dump as disclosed with respect to FIG. 2 and FIG. 3 that provide conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

FIG. 5 is one embodiment of an additive manufacturing system that includes a high speed light valve and a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system as disclosed with respect FIG. 2, FIG. 3, and FIG. 4. After shaping, the beam is two-dimensionally patterned by an energy patterning unit 530 based on resonance based material, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed can be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units. 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An additive manufacturing system, comprising:
   a first light source configured to generate a first laser write beam with a first fluence;
   a second light source generating a second laser read beam having a second fluence greater than the first laser write beam;
   a first 2D patternable light valve configured to have a transmittivity thereof patterned by the first laser write beam;
   a third light source generating a third laser write beam with a third fluence less than the second fluence;
   a second 2D patternable light valve configured to have a transmittivity thereof patterned by the third laser write beam, the first 2D patternable light valve and second 2D patternable light valve configured to transmit the second laser read beam to produce a patterned laser beam;

an intermediate layer group positioned between the first 2D patternable light valve and the second 2D patternable light valve, the intermediate layer group including, in order, a first alignment layer interfacing with the first 2D patternable light valve, a first transparent conductive oxide layer, a support layer, a second transparent conductive oxide layer, and a second alignment layer interfacing with the second 2D patternable light valve; and a print chamber performing printing using the patterned laser beam.

2. The additive manufacturing system of claim 1, wherein the first and second 2D patternable light valves directs unpatterned light into at least one of a beam dump or switchyard system.

3. The additive manufacturing system of claim 1, wherein:

the first 2D patternable light valve includes a first photoconductor layer and a first linear electro-optic layer;

the second 2D patternable light valve includes a second photoconductive layer and a second linear electro-optic layer;

the first photoconductor layer is configured to change in resistance to mirror an intensity pattern of the first laser write beam and create a corresponding first patterned electric field at the first linear electro-optic layer, the first patterned electric field causing a corresponding change in birefringence of the first linear electro-optic layer;

the second photoconductor layer is configured to change in resistance to mirror an intensity pattern of the third laser write beam and create a corresponding second patterned electric field at the second linear electro-optic layer, the second patterned electric field causing a corresponding change in birefringence of the second linear electro-optic layer; and the corresponding change in birefringence of the first and second linear electro-optic layers is configured to produce the patterned laser beam from the second laser read beam.

4. The additive manufacturing system of claim 1, wherein the first laser write beam is incident on the first 2D patternable light valve in a first direction and the third laser write beam is incident on the second patternable light valve in a second direction opposite the first direction.

5. The additive manufacturing system of claim 1, further comprising a beam pattern separator configured to allow a desired pattern of the second laser read beam to be re-imaged into the print chamber while an unwanted pattern of the second laser read beam is sent to a beam dump or switchyard system.

* * * * *